United States Patent
Shima et al.

(10) Patent No.: US 7,144,660 B2
(45) Date of Patent: Dec. 5, 2006

(54) NON-AQUEOUS ELECTROLYTE SOLUTION AND NON-AQUEOUS ELECTROLYTE SOLUTION SECONDARY BATTERY USING THE SAME

(75) Inventors: Kunihisa Shima, Ibaraki (JP); Kenji Shizuka, Ibaraki (JP); Makoto Ue, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 29 days.

(21) Appl. No.: 10/397,320

(22) Filed: Mar. 27, 2003

(65) Prior Publication Data

US 2003/0180626 A1 Sep. 25, 2003

Related U.S. Application Data

(63) Continuation of application No. PCT/JP02/07392, filed on Jul. 22, 2002.

(30) Foreign Application Priority Data

| Jul. 27, 2001 | (JP) | 2001-227476 |
| Sep. 21, 2001 | (JP) | 2001-289868 |
| Sep. 21, 2001 | (JP) | 2001-289869 |
| Sep. 21, 2001 | (JP) | 2001-289870 |

(51) Int. Cl.
*H01M 10/40* (2006.01)

(52) U.S. Cl. ............ 429/324; 429/326; 429/330; 252/62.2

(58) Field of Classification Search ............ 429/324, 429/326, 330; 252/62.2

See application file for complete search history.

(56) References Cited

U.S. PATENT DOCUMENTS

| 6,074,777 A | 6/2000 | Reimers et al. |
| 2002/0001756 A1* | 1/2002 | Hamamoto et al. ......... 429/324 |

FOREIGN PATENT DOCUMENTS

| EP | 0 759 641 A1 | 2/1997 |
| EP | 0 778 058 A2 | 5/1997 |
| JP | 10-321258 | 12/1998 |
| JP | 2000-58116 | 2/2000 |
| JP | 2001-015155 | 1/2001 |
| JP | 2001-015158 | 1/2001 |
| JP | 2001-23690 | 1/2001 |
| JP | 2001-210364 | 8/2001 |
| JP | 2002-50398 | 2/2002 |
| JP | 2002-117895 | 4/2002 |
| JP | 2002-260725 | 9/2002 |
| WO | WO 02/47192 | 6/2002 |

\* cited by examiner

*Primary Examiner*—Jonathan Crepeau
(74) *Attorney, Agent, or Firm*—Oblon, Spivak, McClelland, Maier & Neustadt, P.C.

(57) ABSTRACT

A non-aqueous electrolyte solution that contains an organic solvent, and a lithium salt and an electrolyte, that is useful for the preparation of a secondary battery that is equipped with a negative electrode and a positive electrode, each of which is capable of storing and releasing lithium, wherein the non-aqueous electrolyte solution contains partially hydrogenated terphenyl that is a mixture of two or more compounds of which one is diphenylcyclohexane that is present in an amount ranging from 10 to 65 wt % of the partially hydrogenated terphenyl and the partially hydrogenated terphenyl has a solubility of not less than 0.5 wt % in the electrolyte solution at room temperature.

10 Claims, 1 Drawing Sheet

NON-AQUEOUS ELECTROLYTE SOLUTION AND NON-AQUEOUS ELECTROLYTE SOLUTION SECONDARY BATTERY USING THE SAME

TECHNICAL FIELD

The present invention relates to a non-aqueous electrolyte solution, and a non-aqueous electrolyte solution secondary battery using the non-aqueous electrolyte solution. In particular, the present invention relates to a non-aqueous electrolyte solution which ensures safety against overcharging, and a non-aqueous electrolyte solution secondary battery using the same.

BACKGROUND ART

With the recent trend of electric appliances toward a less weight and a smaller size, lithium secondary batteries are demanded which enable higher energy density. Further, with spread of the application fields of the lithium secondary batteries, improvements are required for higher characteristics of the batteries.

Generally, the lithium secondary battery employs, a carbon material which is capable of storing and releasing lithium ions as an active material for a negative electrode; a lithium-containing metal oxide such as $LiCoO_2$, $LiMn_2O_4$, and $LiNiO_2$ as an active material for a positive electrode; and a solution of a lithium salt dissolved in a mixed solvent composed suitably of a solvent with a high dielectric constant and a low viscosity solvent as the non-aqueous electrolyte solution. In such a lithium secondary battery, in charging, the lithium is released from the active material for a positive electrode and is stored by the active material for a negative electrode, whereas in electric discharge, the lithium is released from the active material for a negative electrode and is stored by the active material for a positive electrode.

The aforementioned solvent with a high dielectric constant includes carbonic acid esters such as ethylene carbonate, and propylene carbonate; and carboxylic acid esters such as γ-butyrolactone. The aforementioned low viscosity solvent includes chain carbonic acid esters such as diethyl carbonate, and dimethyl carbonate; and ethers such as dimethoxyethane. The aforementioned lithium salt includes $LiClO_4$, $LiPF_6$, $LiBF_4$, $LiCF_3SO_3$, $LiN(CF_3SO_3)_2$, and $LiN(CF_3CF_2SO_3)_2$.

When such a lithium secondary battery is overcharged, with progress of the overcharged state, excessive release of lithium will be caused at the positive electrode, whereas excessive storage of lithium will occur at the negative electrode, and in some cases, metallic lithium may deposit. In such a state, both the positive electrode and the negative electrode will become thermally instable to cause decomposition of the electrolyte solution and violent heat generation, thereby causing abnormal heat generation in the battery to cause the problem of impairing the safety of the battery. Such problems become especially significant with the increase of the energy density of the non-aqueous electrolyte solution battery.

To solve the above problems, techniques are disclosed which employ a small amount of an aromatic compound added as an additive to the electrolyte solution of the non-aqueous electrolyte solution battery to ensure the safety of the battery in an overcharged state.

Japanese Patent Laid-Open No. 106835/1997 discloses a method for protecting a battery in an overcharged state by addition of a small amount of biphenyl, 3-R-thiophene (R being a bromine atom, a chlorine atom, or a fluorine atom), furan, or 3-chlorothiophene, and a battery containing such an additive. In this method, at a voltage higher than the maximum working voltage, the additive will polymerize to increase the internal resistance of the battery to secure the safety of the battery in overcharging. However, when biphenyl is used as a additive, because biphenyl is solid, biphenyl is less soluble in the electrolyte solution, and a portion of the additive may precipitate in a low-temperature operation to cause the problem of lowering the battery characteristics. Furan or 3-chlorothiophene is liable to be oxidized to cause the problem of impairing the battery characteristics.

Japanese Patent Laid-Open No. 58116/2000 discloses terphenyl, and alkyl-substituted terphenyls as the additive. Japanese Patent Laid-Open No. 15158/2001 discloses p-terphenyl as the additive. In these disclosures, the additive is used in a small amount to secure the safety of the battery in the overcharge in the similar manner. These additives are also solid, and are less soluble, causing the problem of deterioration of the battery characteristics such as low-temperature characteristics. In particular, because m-terphenyl and p-terphenyl have a higher melting point, and are not sufficiently soluble in the solvent depending upon a kind of organic solvents, it is disadvantageously difficult to practically use them as batteries.

In view of the above problems of lithium secondary batteries, the present invention intends provide a non-aqueous electrolyte solution containing an additive which does not affect adversely to the battery characteristics such as low-temperature characteristics and storing characteristics and functions effectively against overcharging, and a non-aqueous electrolyte solution secondary battery using the same.

DISCLOSURE OF THE INVENTION

The present invention provides a non-aqueous electrolyte solution containing an organic solvent, and a lithium salt as an electrolyte, which is useful for a secondary battery equipped with a negative electrode and a positive electrode both capable of storing and releasing lithium, which is characterized in that the non-aqueous electrolyte solution contains partially hydrogenated terphenyl and the partially hydrogenated terphenyl has a solubility of not less than 0.5 wt % in the electrolyte solution at room temperature.

In another embodiment, the present invention provides a non-aqueous electrolyte solution containing an organic solvent, and a lithium salt as an electrolyte, which is useful for a secondary battery equipped with a negative electrode and a positive electrode both capable of storing and releasing lithium, which is characterized in that the non-aqueous electrolyte solution contains partially hydrogenated m-terphenyl.

In still another embodiment, the present invention provides a non-aqueous electrolyte solution containing an organic solvent, and a lithium salt as an electrolyte, which is useful for a secondary battery equipped with a negative electrode and a positive electrode both capable of storing and releasing lithium, which is characterized in that the non-aqueous electrolyte solution contains partially hydrogenated m-terphenyl, and the partially hydrogenated m-terphenyl contains diphenylcyclohexane at a content ranging from 10 to 65 wt %.

In a further embodiment, the present invention provides a non-aqueous electrolyte solution containing an organic solvent, and a lithium salt as an electrolyte, which is useful for a secondary battery equipped with a negative electrode and a positive electrode both capable of storing and releasing lithium, which is characterized in that the non-aqueous electrolyte solution contains partially hydrogenated terphenyl, and the partially hydrogenated terphenyl contains cyclohexylbiphenyl at a content ranging from 3 to 35 wt %.

In a still further embodiment, the present invention provides a non-aqueous electrolyte solution containing an organic solvent, and a lithium salt as an electrolyte, which is useful for a secondary battery equipped with a negative electrode and a positive electrode both capable of storing and releasing lithium, which is characterized in that the non-aqueous electrolyte solution contains diphenylcyclohexane at a content ranging from 0.01 to 6.5 wt % based on the total weight of the non-aqueous electrolyte solution.

In a still further embodiment, the present invention provides a non-aqueous electrolyte solution containing an organic solvent, and a lithium salt as an electrolyte, which is useful for a secondary battery equipped with a negative electrode and a positive electrode both capable of storing and releasing lithium, which is characterized in that the non-aqueous electrolyte solution contains cyclohexylbiphenyl at a content ranging from 0.003 to 3.5 wt % based on the total weight of the non-aqueous electrolyte solution.

In a still further embodiment, the present invention provides a non-aqueous electrolyte solution secondary battery provided with a negative electrode and a positive electrode capable of storing and releasing lithium, and a non-aqueous electrolyte solution containing an organic solvent and a lithium salt as an electrolyte, which is characterized by using the non-aqueous electrolyte solution mentioned above.

The non-aqueous electrolyte solution of the present invention contains a partially hydrogenated terphenyl such as diphenylcyclohexane, and cyclohexylbiphenyl. Therefore, when the secondary battery using the non-aqueous electrolyte solution is brought to an overcharging state, an oxidation reaction will occur at the positive electrode to generate hydrogen gas and to cause a polymerization reaction. The formed polymer is less soluble in the non-aqueous electrolyte solution and serves as a resistor to increase the internal resistance of the battery to prevent overcharge effectively.

The partially hydrogenated terphenyl which has a solubility of not less than 0.5 wt % in the electrolyte solution at room temperature is liquid at ordinary temperatures. Therefore, this additive will not precipitate in low-temperature operation, not causing the problem of deterioration of the battery characteristics.

The partially hydrogenated m-terphenyl is liquid at ordinary temperatures. Therefore, the additive will not precipitate in low-temperature operation, not causing the problem of deterioration of the battery characteristics.

The partially hydrogenated terphenyl, which contains diphenylcyclohexane at a content ranging from 10 to 65 wt % based on the partially hydrogenated terphenyl, is liquid at ordinary temperatures. Therefore, the additive will not precipitate in low-temperature operation, not causing the problem of deterioration of the battery characteristics.

The partially hydrogenated terphenyl, which contains cyclohexylbiphenyl at a content ranging from 3 to 35 wt % based on the partially hydrogenated terphenyl, is liquid at ordinary temperatures. Therefore, the additive will not precipitate in low-temperature operation, not causing the problem of deterioration of the battery characteristics.

Accordingly, the non-aqueous electrolyte solution containing the partially hydrogenated terphenyl of the present invention, when used in a secondary battery, will not affect adversely the battery characteristics such as low-temperature characteristics and storing characteristics, thereby ensuring safety even in overcharge, and contributing to safety, miniaturization, and performance improvement of the non-aqueous electrolyte solution secondary battery.

Figure 1:
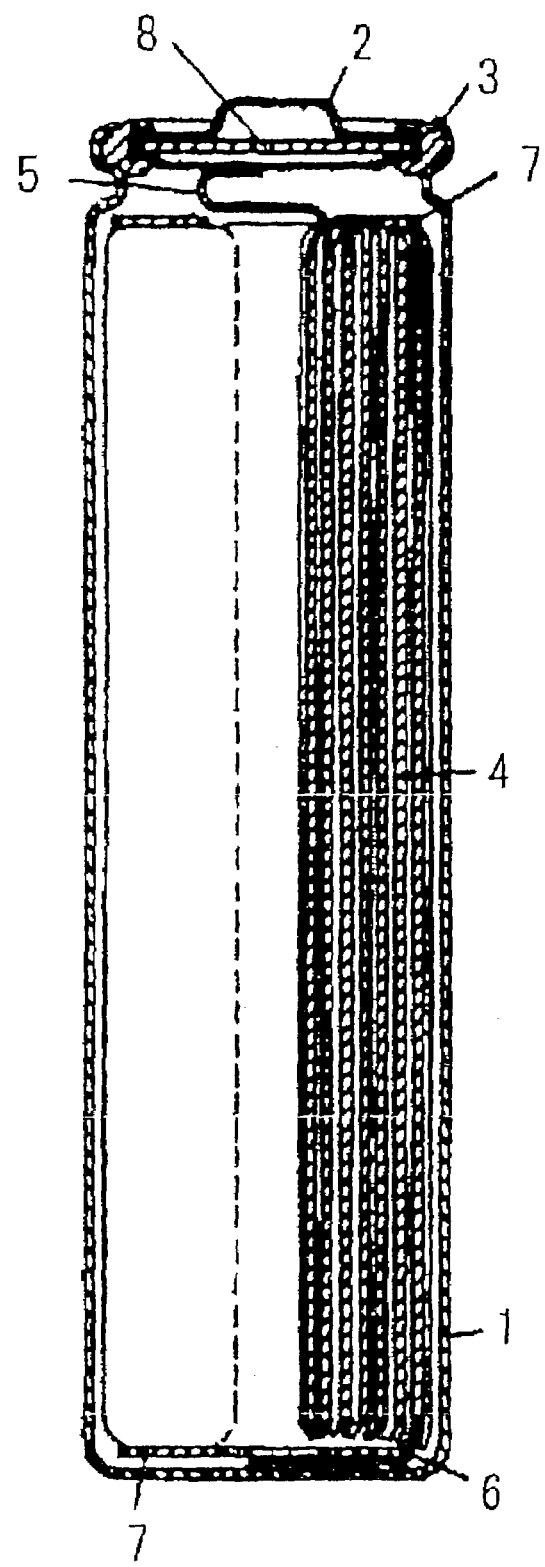
FIG. 1 is a schematic sectional view illustrating a structure of the cylindrical battery employed in Examples of the present invention and Comparative Examples.

In the drawing, the numerals indicate the members as follows: 1, a battery case; 2, a sealing plate; 3, an insulating gasket; 4, a rolled-up electrode; 5, a positive electrode lead; 6, a negative electrode lead; 7, an insulating ring; and 8, a current cut-off device.

BEST MODE FOR CARRYING OUT THE INVENTION

The present invention is described below in detail.

The non-aqueous electrolyte solution of the present invention is a non-aqueous electrolyte solution for a secondary battery which employs combination of a negative electrode and a positive electrode both capable of storing and releasing lithium, and is a non-aqueous electrolyte solution containing partially hydrogenated terphenyl and having a solubility of not lower than 0.5 wt % in the electrolyte solution at room temperature.

(Non-Aqueous Electrolyte Solution)

The non-aqueous electrolyte solution of the present invention contains an organic solvent and a lithium salt as an electrolyte. The organic solvent is selected from aprotic organic solvents, including, for example, cyclic carbonic acid esters of 3–10 carbons such as ethylene carbonate, propylene carbonate, and butylene carbonate; chain carbonic acid esters of 3–10 carbons such as dimethyl carbonate, diethyl carbonate, and ethyl methyl carbonate; cyclic carboxylic acid esters of 4–10 carbons such as γ-butyrolactone, γ-valerolactone; chain carboxylic acid esters of 3–10 carbons such as methyl acetate, and methyl propionate; cyclic ethers of 4–10 carbons such as tetrahydrofuran, 2-methyltetrahydrofuran, and tetrahydropyran; chain ethers of 3–10 carbons such as dimethoxyethane, and dimethoxymethane; sulfur-containing organic solvents of 4–10 carbons such as sulfolane, and diethylsulfolane. These are used singly or in combination of two or more thereof.

The non-aqueous electrolyte solution contains a lithium salt as an electrolyte. The lithium salt is not particularly limited, provided that the lithium salt can be used as an electrolyte of an electrolyte solution. The lithium salt includes inorganic lithium salts such as $LiClO_4$, $LiPF_6$, and $LiBF_4$; fluorine-containing organic lithium salts such as $LiCF_3SO_3$, $LiN(CF_3SO_3)_2$, $LiN(CF_3CF_2SO_3)_2$, $LiN(CF_3SO_3)(C_4F_9SO_2)$, and $LiC(CF_3SO_3)_3$. In particular it is preferred to use $LiPF_6$, and $LiBF_4$. These lithium compounds may be used singly or in combination of two or more thereof.

The molar concentration of the lithium salt as the solute contained in the non-aqueous electrolyte solution is preferably from 0.5 to 2.0 mol/l. Within this molar concentration range, the electric conductivity of the electrolyte solution is in a suitable range to keep the good battery performance.

The non-aqueous electrolyte solution of the present invention contains partially hydrogenated terphenyl. This partially hydrogenated terphenyl has a solubility of not lower than 0.5 wt % based on the entire amount of the electrolyte solution at room temperature. The partially hydrogenated terphenyl herein means a product obtained by adding hydrogen to the double bonds of the benzene ring of terphenyl including o-terphenyl, m-terphenyl, and p-terphenyl. In the present invention, among the terphenyls, preferred is m-terphenyl.

The partially hydrogenated terphenyl may be a single compound or may be a mixture of two or more compounds. For example, the mixture may be a mixture of two or more partially hydrogenated terphenyls of different partial hydrogenation ratios, a mixture of two or more partially hydrogenated terphenyls of an equal hydrogenation ratio but different in the hydrogenation position of the benzene ring or different in the position of the double bonds, or a mixture of structural isomers.

Such a partially hydrogenated terphenyl should have a solubility of not lower than 0.5 wt % in the electrolyte at room temperature. The partially hydrogenated terphenyl having a solubility of less than 0.5 wt % in the electrolyte at room temperature is not dissolved in the solvent component of the electrolyte solution or will precipitate in case of use as the battery, being not suitable. In the present invention, the solubility is preferably not less than 1.0 wt %, particularly preferably not less than 1.5 wt %.

The "room temperature" as the standard of the solubility measurement means literally a temperature in a usual room, and is specifically preferably about 25±5° C.

The partial hydrogenation ratio of the terphenyl is calculated as below. The partial hydrogenation ratio is 0% for the terphenyl in which no hydrogen is added to the double bonds of the benzene ring of the terphenyl. The partial hydrogenation ratio is 100% for the completely hydrogenated terphenyl, namely the terphenyl in which hydrogen is added to all of the double bonds (18 moles of hydrogen atom to 1 mole of terphenyl). For a mixture, the partial hydrogenation ratio is calculated as the molar average. For example, when two moles of hydrogen atoms are added to one mole of terphenyl, the partial hydrogenation ratio is 11.1 (=2/18)%.

The partially hydrogenated terphenyl can be synthesized by reaction of terphenyl with hydrogen in the presence of a hydrogenation catalyst such as platinum, palladium, and nickel. The partially hydrogenated product may be obtained as a single compound by selecting suitably the reaction conditions, or by isolation and purification of the reactant by a conventional manner. The reaction product may be obtained as a mixture without isolation and purification. Otherwise the partially hydrogenated terphenyl can be synthesized, not by hydrogenation of terphenyl, but by an organic synthesis reaction starting from cyclohexane, cyclohexylmagnesium halide, cyclohexyllithium, cyclohexene, cyclohexadiene, benzene, cyclohexylbenzene, halogenated benzene, or the like as the starting material. Furthermore, the mixture of partially hydrogenated products can be prepared by mixing two or more of single compounds in an optional composition. The partial hydrogenation ratio of the mixture of the partially hydrogenated terphenyls obtained by synthesis can be calculated as an average ratio by measuring the composition ratio of the constitutional components by gas chromatography.

The content of terphenyl contained in the partially hydrogenated terphenyl in the present invention is preferably not higher than 6 wt %, more preferably not higher than 3 wt %, still more preferably not higher than 1 wt %, most preferably not higher than the detection limit (0.1 wt % or less) in gas chromatography based on the entire amount of the partially hydrogenated terphenyl in view of the storing characteristics of battery.

In view of the storing characteristics of battery in the present invention, the lower limit of the content of diphenylcyclohexane (1,2-, 1,3-, 1,4-diphenylcyclohexane) in the partially hydrogenated terphenyl is preferably not lower than 10 wt %, more preferably not lower than 15 wt %. The upper limit of the content is preferably not higher than 65 wt %, more preferably not higher than 60 wt %.

In view of the storing characteristics of battery in the present invention, the upper limit of the content of cyclohexylbiphenyl (o-, m-, p-cyclohexylbiphenyl) in the partially hydrogenated terphenyl is preferably not lower than 3 wt %, more preferably not lower than 5 wt %. The upper limit of the content is preferably not higher than 35 wt %, more preferably not higher than 30 wt %.

The non-aqueous electrolyte solution of the present invention is a non-aqueous electrolyte solution for a secondary battery which employs combination of a negative electrode and a positive electrode both capable of storing and releasing lithium, and contains partially hydrogenated m-terphenyl in a non-aqueous electrolyte solution. The content of the partially hydrogenated m-terphenyl in the non-aqueous electrolyte solution is preferably not higher than 6 wt % in view of the storing characteristics of battery.

The non-aqueous electrolyte solution of the present invention is a non-aqueous electrolyte solution for a secondary battery which employs combination of a negative electrode and a positive electrode both capable of storing and releasing lithium, and contains partially hydrogenated terphenyl, and the content of diphenylcyclohexane in the partially hydrogenated terphenyl ranges from 10 to 65 wt %. The "partially hydrogenated terphenyl" is explained above. The "diphenylcyclohexane" is also explained above. Particularly preferred is partially hydrogenated m-terphenyl containing 1,3-diphenylcyclohexane. The content of diphenylcyclohexane in the partially hydrogenated terphenyl is the same as that mentioned above.

The non-aqueous electrolyte solution of the present invention is a non-aqueous electrolyte solution for a secondary battery which employs combination of a negative electrode and a positive electrode both capable of storing and releasing lithium, and contains partially hydrogenated terphenyl, and the content of cyclohexylbiphenyl in the partially hydrogenated terphenyl in the range of 3–35 wt %. The "partially hydrogenated terphenyl" is explained above. The "cyclohexylbiphenyl" is also explained above. Particularly preferred is partially hydrogenated m-terphenyl containing m-cyclohexylbiphenyl. The content of cyclohexylbiphenyl in the partially hydrogenated terphenyl is the same as that mentioned above.

The partial hydrogenation ratio of the partially hydrogenated terphenyl may be higher than 0% and lower than 100%. The partially hydrogenated terphenyl may contain terpheyl terphenyl (partial hydrogenation ratio: 0%), or may contain completely hydrogenated terphenyl (partial hydrogenation ratio: 100%). However, the molar average partial hydrogenation ratio of the mixture is adjusted to be higher than 0% and lower than 100%. In view of the storing characteristics of the battery and the solubility in the electrolyte solution, the lower limit is preferably not lower than 30%, more preferably not lower than 35%, and the higher limit is preferably not higher than 70%, more preferably not higher than 60%.

The content of the partially hydrogenated m-terphenyl is, in view of the overcharge-suppressing action and the electroconductivity, preferably not lower than 0.01 wt %, more preferably not lower than 0.1 wt %, still more preferably not lower than 0.5 wt % as the lower limit, and preferably not higher than 10 wt %, more preferably not higher than 5 wt %, still more preferably not higher than 3 wt % as the upper limit, based on the entire amount of the non-aqueous electrolyte solution.

The non-aqueous electrolyte solution of the present invention is a non-aqueous electrolyte solution for a secondary battery, and contains diphenylcyclohexane in the content range of 0.01–6.5 wt % based on the total weight of the non-aqueous electrolyte solution. The content of diphenylcyclohexane is preferably in the range of 0.075–3 wt %.

The non-aqueous electrolyte solution of the present invention is a non-aqueous electrolyte solution for a secondary battery, and contains cyclohexylbiphenyl in the content range of 0.003–3.5 wt % based on the total weight of the non-aqueous electrolyte solution. The content of cyclohexylbiphenyl is preferably in the range of 0.025–1.5 wt %.

For improvement of the cycling life characteristics and the charge-discharge efficiency, the non-aqueous electrolyte solution of the present invention may contain another additive such as a vinylene carbonate analogue like vinylene carbonate, vinylethylene carbonate, phenylethylene carbonate, and succinic anhydride. A particularly preferred additive is vinylene carbonates represented by General Formula (I):

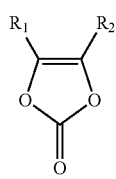

(I)

(in the General Formula, $R_1$ and $R_2$ represent independently a hydrogen atom or methyl) preferably in an amount of 0.1–10 wt % based on the total weight of the non-aqueous electrolyte solution.

For improvement of the storing characteristics, the non-aqueous electrolyte solution of the present invention may contain an additive, the additive including sulfite esters such as ethylene sulfite, propylene sulfite, and dimethyl sulfite; sulfonic acid esters such as propanesultone, butanesultone, methyl methanesulfonate, and methyl toluenesulfonate; sulfate esters such as dimethyl sulfate, and ethylene sulfate; sulfones such as sulfolane, dimethylsulfone, and diethylsulfone; sulfoxides such as dimethylsulfoxide, diethylsulfoxide, and tetramethylenesulfoxide; sulfides such as diphenyl sulfide, and thioanisole; and disulfides such as diphenyldisulfide, and dipyridinium disulfide. Further, for improvement of the low-temperature characteristics, the non-aqueous electrolyte solution may contain an additive such as fluorinated benzene like fluorobenzene.

The non-aqueous electrolyte solution of the present invention is used for the secondary battery equipped with a negative electrode and a positive electrode both capable of storing and releasing lithium.

(Negative Electrode)

The negative electrode constituting the battery of the present invention is not specially limited, provided that the negative electrode is capable of storing and releasing lithium. However, the negative electrode contains preferably a carbonaceous material capable of storing and releasing lithium as an active material for a negative electrode. The carbonaceous material includes specifically thermal decomposition products of an organic compound under various thermal decomposition conditions, artificial graphite, and natural graphite.

The carbonaceous material has preferably a d-value (interlayer distance) of the lattice planes (002 plane) of 0.335–0.340 nm, more preferably 0.335–0.337 nm, by X-ray diffraction according to the method of Gakushin (The Japan Society for Promotion of Science). The ash content of the above carbonaceous material is preferably not higher than 1 wt %, more preferably not higher than 0.5 wt %, still more preferably not higher than 0.1 wt % base on the total weight of the carbonaceous material. The crystallite size (Lc) is preferably not less than 30 nm, more preferably not less than 50 nm, still more preferably not less than 100 nm by X-ray diffraction according to the method of Gakushin (The Japan Society for Promotion of Science).

The aforementioned carbonaceous material has a median diameter preferably in the range of 1–100 µm, more preferably not more than 3–50 µm, more preferably 5–40 µm, still more preferably 7–30 µm by a laser diffraction-scattering method. The BET specific surface area thereof is preferably in the range of 0.3–25.0 m$^2$/g, more preferably 0.5–20.0 m$^2$/g, still more preferably 0.7–15.0 m$^2$/g, particularly preferably 0.8–10.0 m$^2$/g. Further, in Raman spectroscopy thereof with argon ion laser, the intensity ratio $R=I_B/I_A$ of peak $P_A$ (peak intensity $I_A$) at 1580–1620 cm$^{-1}$ to peak $P_B$ (peak intensity $I_B$) at 1350–1370 cm$^{-1}$ is preferably in the range of 0–1.2; and the half width of the peak in the range of 1580–1620 cm$^{-1}$ is preferably not more than 26 cm$^{-1}$, particularly preferably not more than 25 cm$^{-1}$.

The preferably useful carbonaceous material may include also materials obtained by mixing and calcining the aforementioned carbonaceous material with an organic material or the like, and materials having amorphous carbon formed by treatment by CVD or a like process on at least a part of the surface in comparison with the carbonaceous material.

The aforementioned organic material includes coal tar pitch such as soft pitch and hard pitch; coal-derived heavy oils such as retorted liquid oil; straight-run heavy oils such as ordinary-pressure bottom oil, and reduced-pressure bottom oil; cracked heavy oils produced as a byproduct in thermal cracking of crude oil or naphtha (e.g., ethylene heavy end). The organic material includes also a material obtained by pulverizing a solid residue obtained from distillation of the above heavy oil at 200–400° C. to a size of 1–100 µm. The organic material includes also vinyl chloride resin and resin precursors which can form phenol resins or imide resins by baking.

Active materials for a negative electrode capable of storing and releasing lithium other than carbonaceous material include metal oxide materials such as tin oxide, and silicon oxide; metallic lithium, and lithium alloys. The active materials for a negative electrode including the above carbonaceous material may be used singly or in combination of two or more thereof.

The process for producing the negative electrode with the above active material for a negative electrode is not limited specially. In an example of the process, the negative electrode is produced by slurrying the active material for a negative electrode by addition of a binder, a thickener, an electroconductive material, a solvent, or the like as necessary; applying the resulting slurry onto a substrate of a current collector; and drying it. The negative electrode may be produced by molding the active material for a negative electrode itself into a sheet electrode by roll molding, or compression-molding the active material for a negative electrode into a pellet electrode.

The binder used for the negative electrode production is not limited specially, provided that the material is stable to the solvent used for the electrode production and the electrolyte solution. The binder includes polyvinylidene fluoride, polytetrafluoroethylene, styrene-butadiene rubber, isoprene rubber, and butadiene rubber.

The thickener useful for production of the negative electrode includes carboxymethylcellusose, methylcellulose, hydroxymethylcellulose, ethylcellulose, polyvinyl alcohol, oxidized starch, phosphorylated starch, and casein.

The electroconductive material useful for production of the negative electrode includes metal materials such as copper, and nickel; and carbonaceous materials such as graphite, and carbon black.

The material for the current collector for the negative electrode includes metals such as copper, nickel, and stainless steel. Of these, copper foils are preferred in view of ease of working into a thin film, and cost of the material.

(Positive Electrode)

The positive electrode constituting the battery of the present invention is not limited particularly, provided that the positive electrode is capable of storing and releasing lithium. A lithium/transition metal composite oxide is preferably used as the active material for a positive electrode. Preferred lithium/transition metal composite oxides include lithium/cobalt composite oxides such as $LiCoO_2$, lithium/nickel composite oxides such as $LiNiO_2$, and lithium/manganese composite oxides such as $LiMn_2O_4$. In particular, a lithium/transition metal composite oxide containing cobalt and/or nickel is preferred. Such a lithium/transition metal composite oxide can be stabilized by replacing a part of the main transition metal by another metal species such as Al, Ti, V, Cr, Mn, Fe, Co, Li, Ni, Cu, Zn, Mg, Ga, or Zr. The lithium/transition metal composite oxide stabilized as described above is more preferable. The active material for a positive electrode may be used singly or in combination of two or more thereof.

The process for preparing the positive electrode is not limited specially, and may be conducted in a similar manner as the process for producing the aforementioned negative electrode. The positive electrode can be shaped by mixing the active material for a positive electrode with a binder, a conductive material, a solvent, or the like as necessary and applying the mixture to a substrate of a current collector to form a sheet-shaped electrode, or can be shaped by press-molding the mixture into a pellet electrode. The binders, electroconductive materials, solvents, and the like include those used in the aforementioned negative electrode production process The material for the current collector for the positive electrode may be selected from aluminum, titanium, tantalum, and the like metals and alloys thereof. Of these, aluminum or alloys thereof are particularly preferred in view of the energy density owing to its light weight.

The separator used for the battery of the present invention are not limited particularly in the material and shape thereof. Preferably, the material is selected from those which is stable to the non-aqueous electrolyte solution and has a sufficient liquid-holding property. The material preferred includes porous sheets and nonwoven fabrics made from polyolefin such as polyethylene and polypropylene.

The process for producing the battery of the present invention comprising at least a negative electrode, a positive electrode, and a non-aqueous electrolyte solution is not limited particularly, but can suitably be selected from conventional processes.

The shape of the battery is not limited particularly. The battery may be a cylinder type battery in which the sheet-shaped electrode and the separator are wound in a spiral; another cylinder type battery in which the pellet electrode and the separator are combined in an inside-out structure; or a coin type battery in which a pellet electrode and the separator are laminated.

EXAMPLES

The present invention is more specifically explained below by reference to Examples and Comparative Examples. The present invention is not limited by the examples within the gist of the invention.

Example 1

[Preparation of Non-Aqueous Electrolyte Solution]

Ethylene carbonate (EC) and ethyl methyl carbonate (EMC) were mixed together at a volume ratio of 3:7 in a dry argon atmosphere. Therein, sufficiently dried lithium hexanefluorophosphate ($LiPF_6$) was dissolved at a ratio of 1 mol/l. Thereto a partially hydrogenated m-terphenyl of partial hydrogenation ratio 40% was added at a concentration of 2 wt % based on the total weight of the electrolyte solution to prepare an electrolyte solution. This electrolyte solution is named Electrolyte Solution 1. The solubility of the partially hydrogenated m-terphenyl in the electrolyte solution was 3 wt % or higher at room temperature.

The partially hydrogenated m-terphenyl compounds used in Examples and Comparative Examples were prepared by reacting m-terphenyl as the starting material with hydrogen gas in the co-presence of platinum, palladium, or a nickel type catalyst at a high temperature and a high pressure. The partial hydrogenation ratio was calculated as an average from the composition ratio of the constituting components of the partially hydrogenated m-terphenyl determined by gas chromatography (the same manner was also applied hereinafter).

[Preparation of Negative Electrode]

As the active material for a negative electrode, there were mixed 94 weight parts of powdery natural graphite (NG-7, supplied by Kansai Netsukagaku K.K.) and 6 weight parts of polyvinylidene fluoride (PVDF) (KF-1000, produced by Kureha Chemical Industry Co.), the powdery natural graphite having a d-value of the lattice plane (002 plane) of 0.336 nm, and a crystallite size (Lc) of 100 nm or larger (652 nm) by X-ray diffraction; an ash content of 0.07 wt %; a median diameter of 12 μm by a laser diffraction scattering method; a BET specific surface area of 7.5 $m^2/g$; and an intensity ratio $R=I_B/I_A$ of peak $P_A$ (peak intensity $I_A$) at 1580–1620 $cm^{-1}$ to peak $P_B$ (peak intensity $I_B$) at 1350–1370 $cm^{-1}$ of 0.12 and a half peak width of 19.9 $cm^{-1}$ in the range of 1580–1620 $cm^{-1}$ by Raman spectroscopy using argon ion laser. The resulting mixture was slurried in N-methyl-2-pyrrolidone (NMP). The resulting slurry mixture was applied uniformly to the both faces of a copper foil of 18 μm thick as the negative electrode current collector. The coated copper foil was allowed to pass through a drier for drying to remove the NMP having been used for preparing the slurry, and was rolled by a roll-pressing machine to prepare the negative electrode plate.

[Preparation of Positive Electrode]

As the active material for a positive electrode, there were mixed 85 weight parts of $LiCoO_2$, 6 weight parts of carbon black, and 9 weight parts of PVDF (KF-1000, produced by Kureha Chemical Industry Co.). The resulting mixture was slurried in NMP. This slurry mixture was applied uniformly to the both faces of an aluminum foil of 20 μm thick as the positive electrode current collector. The coated copper foil was allowed to pass through a drier for drying to remove the NMP used for preparing the slurry, and was rolled by a roll-pressing machine to prepare the positive electrode plate.

[Preparation of Battery]

The negative electrode plate and the positive electrode plate prepared as described above were superposed with interposition of a separator constituted of a microporous polyethylene film not to cause direct contact between the negative electrode plate and the positive electrode plate, and were rolled up. The outermost peripheral face was bound with a tape to form a rolled-up electrodes. Then as shown in FIG. 1, insulating rings 7 were fixed to the top and bottom ends of the rolled-up electrodes 4, and the rolled-up electrodes were inserted through the opening of the case into a cylindrical stainless steel battery case which serves also as a negative electrode terminal. Then a negative electrode lead 6 connected to the negative electrode of the electrode body was welded to the inside bottom of the battery case 1, and a positive electrode lead 5 connected to the positive electrode of the electrode body was welded to the bottom of a current cut-off device 8 which will be actuated at a gas pressure higher than a prescribed level at the inside of the battery. At the bottom of the sealing plate 2, a blast barrier valve and a current cut-off device were bonded. Then, Electrolyte Solution 1 was injected into the battery case 1, and the opening of the battery case was sealed tightly with the sealing plate and an insulating gasket 3 made of polypropylene (PP). Thus Battery 1 was produced.

Example 2

In a similar manner as in Example 1, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 55% at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 2. Battery 2 was produced in the same manner as in Example 1 except that Electrolyte Solution 2 was used in place of Electrolyte Solution 1.

Example 3

In a similar manner as in Example 1, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 40% at a concentration of 1 wt % based on the total weight of the electrolyte solution. The partially hydrogenated m-terphenyl had a solubility of not less than 3 wt % in the electrolyte solution at room temperature. This electrolyte solution was named Electrolyte Solution 3. Battery 3 was produced in the same manner as in Example 1 except that Electrolyte Solution 3 was used in place of Electrolyte Solution 1.

Example 4

In a similar manner as in Example 1, an electrolyte solution was prepared by mixing EC and EMC in a volume ratio of 3:7, dissolving $LiPF_6$ therein at a ratio of 1 mol/l, and adding thereto vinylene carbonate (VC) at a concentration of 2 wt %, and partially hydrogenated m-terphenyl of partial hydrogenation ratio of 40% at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 4. Battery 4 was produced in the same manner as in Example 1 except that Electrolyte Solution 4 was used in place of Electrolyte Solution 1.

Example 5

In a similar manner as in Example 1, an electrolyte solution was prepared by mixing EC and EMC in a volume ratio of 3:7; dissolving $LiPF_6$ therein at a ratio of 1 mol/l; and adding thereto vinylene carbonate (VC) at a concentration of 1 wt %, propane-sultone at a concentration of 1 wt %, and partially hydrogenated m-terphenyl of partial hydrogenation ratio of 40% at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 5. Battery 5 was produced in the same manner as in Example 1 except that Electrolyte Solution 5 was used in place of Electrolyte Solution 1.

Example 6

In a similar manner as in Example 1, an electrolyte solution was prepared by mixing EC and EMC in a volume ratio of 3:7, dissolving $LiPF_6$ therein at a ratio of 1 mol/l, and adding thereto partially hydrogenated o-terphenyl of partial hydrogenation ratio of 50% at a concentration of 2 wt % based on the total weight of the electrolyte solution. The partially hydrogenated o-terphenyl had a solubility of not less than 3 wt % in the electrolyte solution at room temperature. This electrolyte solution was named Electrolyte Solution 6. Battery 6 was produced in the same manner as in Example 1 except that Electrolyte Solution 6 was used in place of Electrolyte Solution 1.

Comparative Example 1

In a similar manner as in Example 1, an electrolyte solution was prepared by mixing EC and EMC in a volume ratio of 3:7, and dissolving $LiPF_6$ therein at a ratio of 1 mol/l. This electrolyte solution was named Comparative Electrolyte Solution 1. Comparative Battery 1 was produced in the same manner as in Example 1 except that Comparative Electrolyte Solution 1 was used in place of Electrolyte Solution 1.

Comparative Example 2

In a similar manner as in Example 1, an electrolyte solution was prepared by mixing EC and EMC in a volume ratio of 3:7, dissolving $LiPF_6$ therein at a ratio of 1 mol/l, and adding thereto o-terphenyl not partially hydrogenated at a concentration of 2 wt % based on the total weight of the electrolyte solution. This electrolyte solution was named Comparative Electrolyte Solution 2. Comparative Battery 2 was produced in the same manner as in Example 1 except that Comparative Electrolyte Solution 2 was used in place of Electrolyte Solution 1.

Comparative Example 3

In a similar manner as in Example 1, preparation of an electrolyte solution was tried by mixing EC and EMC in a volume ratio of 3:7, dissolving $LiPF_6$ therein at a ratio of 1 mol/l, and adding thereto m-terphenyl not partially hydrogenated at a concentration of 2 wt % based on the total weight of the electrolyte solution. However, the m-terphenyl was not dissolved, so that the battery could not be produced.

Batteries 1–6 and Comparative Batteries 1–2 produced in the above Examples 1–6 and Comparataive Examples 1–2 were tested for the safety in an overcharged state, the low-temperature characteristics, and the recovery ratio after storage of the batteries.

[Overcharging Test]

Each of Batteries 1–6 and Comparative Batteries 1–2 as described above was charged with a charging current of 1 C to the battery voltage of 4.2 V at room temperature (25° C.), and then charged at a constant voltage of 4.2 V for 2.5 hours to bring the battery to the fully charged state. Further, as the overcharging test, each battery was overcharged by applying a charging current of 1 C. The time length from the start of the current flow to the actuation of the current cut-off device, and the maximum temperature of each battery were measured. Table 1 shows the results. A shorter time before the actuation of the current cut-off device and a lower level of the maximum temperature of the battery means greater safety of the battery in overcharge.

[Low-Temperature Characteristics]

Each of Batteries 1–6 and Comparative Batteries 1–2 as described above was charged with a charging current of 1 C to the battery voltage of 4.2 V at room temperature (25° C.), and then charged at a constant voltage of 4.2 V for 2.5 hours to bring the batteries to the fully charged state. The battery was left standing at room temperature for 3 hours. Then the battery was allowed to discharge at a discharge current of 1 C at room temperature to reach the battery voltage of 3 V. The discharging capacity (mAh) at room temperature was obtained from the discharge time.

Next, each of the above Batteries 1–6 and Comparative Batteries 1–2 was charged with a charging current of 1 C to the battery voltage of 4.2 V at room temperature (25° C.), and then charged at a constant voltage of 4.2 V for 2.5 hours to bring the battery to the fully charged state. The battery was left standing at 0° C. for 3 hours. Then the battery was allowed to discharge at a discharge current of 1 C at 0° C. to reach the battery voltage of 3 V. The discharging capacity (mAh) at room temperature was obtained from the discharge time length.

From the above discharging capacities at room temperature and 0° C., the low-temperature characteristics were represented by the ratio of the discharging capacity at 0° C. to the discharging capacity at room temperature, calculated by the equation below. Table 1 shows the results. Higher low-temperature characteristics mean better low-temperature characteristics.

Low-temperature characteristics (%)=(Discharging capacity (*mAh*) at 0° C.)÷(Discharging capacity (*mAh*) at room temperature)×100

[Recovery Ratio after Storage]

Each of Batteries 1–6 and Comparative Batteries 1–2 as described above was charged with a charging current of 1 C at room temperature (25° C.) to the battery voltage of 4.2 V, and further charged at a constant voltage of 4.2 V for 2.5 hours to bring the battery to the full charge state. The battery was left standing at room temperature for 3 hours. Then the battery was allowed to discharge at a discharge current of 1 C at room temperature to reach the battery voltage of 3 V. The discharging capacity (mAh) at room temperature was obtained from the discharge time length.

Next, the battery was charged again with a charging current of 1 C to the battery voltage of 4.2 V at room temperature (25° C.), and then charged at a constant voltage of 4.2 V for 2.5 hours to bring the battery to the full charge state. This battery was stored in an atmosphere of 60° C. for 20 days.

Then each of Batteries 1–6 and Comparative Batteries 1–2 as described above was allowed to discharge at a discharge current of 1 C at room temperature to reach the battery voltage of 3 V. Then the battery was charged with a charging current of 1 C at room temperature (25° C.) to the battery voltage of 4.2 V, and further charged at a constant voltage of 4.2 V for 2.5 hours to bring the battery to the fully charged state. The battery was left standing at room temperature for 3 hours. Then the battery was allowed to discharge at a discharge current of 1 C at room temperature to reach the battery voltage of 3 V. The discharging capacity (mAh) at room temperature was obtained from the discharge time length.

From the above discharging capacity before storage at 60° C. and the discharging capacity after storage at 60° C., the recovery ratio after storage was represented by the ratio of the discharging capacity after storage to the discharging capacity before storage, calculated by the equation below. Table 1 shows the results. A higher recovery ratio after storage means better storing characteristics.

Recovery ratio after storage (%)=(Discharging capacity (*mAh*) after storage)÷(Discharging capacity (*mAh*) before storage)×100

TABLE 1

| Battery | Electrolytic solution | Additive | Current cut-off time (min) | Maximum Temp. (° C.) | Low-temp Characteristics (° C.) | Recovery ratio after storage (%) |
|---|---|---|---|---|---|---|
| Battery 1 | Solution 1 | m-Terphenyl of partial hydrogenation ratio of 40%:2 wt % | 47 | 80 | 95 | 93 |
| Battery 2 | Solution 2 | m-Terphenyl of partial hydrogenation ratio of 55%:2 wt % | 48 | 81 | 95 | 92 |
| Battery 3 | Solution 3 | m-Terphenyl of partial hydrogenation ratio of 40%:1 wt % | 49 | 82 | 96 | 94 |

TABLE 1-continued

| Battery | Electrolytic solution | Additive | Current cut-off time (min) | Maximum Temp. (° C.) | Low-temp Characteristics (° C.) | Recovery ratio after storage (%) |
|---|---|---|---|---|---|---|
| Battery 4 | Solution 4 | m-Terphenyl of partial hydrogenation ratio of 40%:2 wt % | 47 | 80 | 94 | 95 |
| Battery 5 | Solution 5 | m-Terphenyl of partial hydrogenation ratio of 40%:2 wt % | 47 | 81 | 94 | 96 |
| Battery 6 | Solution 6 | o-Terphenyl of partial hydrogenation ratio of 50%:2 wt % | 48 | 83 | 94 | 88 |
| Comparative Battery 1 | Comparative Solution 1 | Not added | 51 | Ruptured | 97 | 97 |
| Comparative Battery 2 | Comparative Solution 2 | o-Terphenyl of no partial hydrogenation: 2 wt % | 50 | 90 | 92 | 90 |

As shown in Table 1, Comparative Battery 1, which contains no overcharge-suppressing additive, ruptured after the lapse of 51 minutes in the overcharging test although the battery was excellent in the low-temperature characteristics and the storing characteristics. Comparative Battery 2 which employs o-terphenyl not partially hydrogenated as the additive gave higher maximum temperature in the overcharging test, and was not preferable in the, low-temperature characteristics and in the storing characteristics. In Comparative Example 3, m-terphenyl which is not partially hydrogenated was employed as the additive, but because the m-terphenyl was insoluble in the electrolyte solution, the battery could not be produced and the characteristics could not be compared.

In contrast, Batteries 1–6 of the present invention containing the partially hydrogenated terphenyl exhibited earlier current cut-off in the overcharging test, lowering of the maximum temperature to 80–83° C., excellent low-temperature characteristics, and excellent storing characteristics.

Example 7

EC and EMC were mixed at a volume ratio of 3:7 in a dry argon atmosphere. Therein, sufficiently dried $LiPF_6$ was dissolved at a ratio of 1 mol/l. Thereto a partially hydrogenated m-terphenyl of partial hydrogenation ratio of 42% and of m-terphenyl content of 3.7 wt % was added at a concentration of 2 wt % based on the total weight of the electrolyte solution to prepare an electrolyte solution. The solubility of the partially hydrogenated m-terphenyl in the electrolyte solution was not lower than 3 wt % at room temperature. This electrolyte solution is named Electrolyte Solution 7.

The content of m-terphenyl was determined by gas chromatography. Table 2 shows the constituting components of the partially hydrogenated m-terphenyl in the electrolyte solution used in Examples 7–11 and Reference Example 1.

TABLE 2

| Composition [wt %] | Example 7 (Electr. Solution 7) | Example 8 (Electr. Solution 8) | Example 9 (Electr. Solution 9) | Example 10 (Electr. Solution 10) | Example 11 (Electr. Solution 11) | Example 12 (Electr. Solution 12) |
|---|---|---|---|---|---|---|
| Fully hydrogenated m-terphenyl | 0.1 | 0.1 | 0.1 | 0.1 | 0.1 | 0.0 |
| 1,3-Dicyclohexylbenzene | 13.3 | 19.3 | 34.6 | 13.3 | 13.3 | 14.6 |
| 3-Phenylbicyclohexyl | 16.2 | 21.7 | 34.7 | 16.2 | 16.2 | 16.6 |
| 1,3-Diphenylcyclohexane | 23.1 | 23.4 | 17.3 | 23.1 | 23.1 | 22.9 |
| m-Cyclohexylbiphenyl | 43.6 | 34.8 | 13.0 | 43.6 | 43.6 | 37.6 |
| m-Terphenyl | 3.7 | 0.2 | 0.0 | 3.7 | 3.7 | 8.3 |
| Others | 0.0 | 0.5 | 0.3 | 0.0 | 0.0 | 0.0 |
| Total | 100.0 | 100.0 | 100.0 | 100.0 | 100.0 | 100.0 |
| Partial hydrogenation ratio [%] | 42 | 47 | 56 | 42 | 42 | 41 |

Note:
In the composition of the table, the numeral 0.0 means the content of not more than the detection limit (less than 0.1 wt %) by gas chromatography. Since the composition values are shown with one decimal place in the table, the arithmetical total of the composition values may not be 100.

Battery 7 was produced in the same manner as in Example 1 except that the Electrolyte Solution 7 was used in place of Electrolyte Solution 1.

Example 8

In a similar manner as in Example 7, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 47% and of m-terphenyl content of 0.2 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 6. Battery 8 was produced in the same manner as in Example 1 except that Electrolyte Solution 8 was used in place of Electrolyte Solution 1.

Example 9

In a similar manner as in Example 7, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 56% and of m-terphenyl content of 0.0 wt % (not more than the detection limit) at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 9. Battery 9 was produced in the same manner as in Example 1 except that Electrolyte Solution 9 was used in place of Electrolyte Solution 1.

Example 10

In a similar manner as in Example 7, an electrolyte solution was prepared by mixing EC and EMC in a volume ratio of 3:7, dissolving $LiPF_6$ therein at a ratio of 1 mol/l, and adding thereto VC at a concentration of 2 wt %, and partially hydrogenated m-terphenyl of partial hydrogenation ratio of 42% and of m-terphenyl content of 3.7 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 10. Battery 10 was produced in the same manner as in Example 1 except that Electrolyte Solution 10 was used in place of Electrolyte Solution 1.

Example 11

In a similar manner as in Example 7, an electrolyte solution was prepared by mixing EC and EMC in a volume ratio of 3:7, dissolving $LiPF_6$ therein at a ratio of 1 mol/l, and adding thereto VC at a concentration of 1 wt %, PS at a concentration of 1.wt %, and partially hydrogenated m-terphenyl of partial hydrogenation ratio of 42% and of m-terphenyl content of 3.7 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 11. Battery 11 was produced in the same manner as in Example 1 except that Electrolyte Solution 11 was used in place of Electrolyte Solution 1.

Example 12

In a similar manner as in Example 7, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 41% and of m-terphenyl content of 8.3 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 12. Battery 12 was prepared in the same manner as in Example 1 except that Electrolyte Solution 12 was used in place of Electrolyte Solution 1.

Batteries 7–12 produced in the above Examples 7–12 were tested in the same manner as above for the safety in the overcharged state, the low-temperature characteristics, and the recovery ratio after storage of the battery. Table 3 shows the results.

TABLE 3

| | Battery | Electrolyte solution | Additive* | Current cut-off time (min) | Max. temp (° C.) | Low-temp characteristics (%) | Recovery after storage (%) |
|---|---|---|---|---|---|---|---|
| Example 7 | Battery 7 | Solution 7 | m-Terphenyl of partial hydrogenation ratio of 42% (m-Terphenyl 3.7 wt %) | 47 | 80 | 95 | 93 |
| Example 8 | Battery 8 | Solution 8 | m-Terphenyl of partial hydrogenation ratio of 47% (m-Terphenyl 0.2 wt %) | 48 | 81 | 95 | 93 |
| Example 9 | Battery 9 | Solution 9 | m-Terphenyl of partial hydrogenation ratio of 56% (m-Terphenyl 0.0 wt %**) | 48 | 80 | 95 | 92 |
| Example 10 | Battery 10 | Solution 10 (Vinylene carbonate) | m-Terphenyl of partial hydrogenation ratio of 42% (m-Terphenyl 3.7 wt %) | 47 | 80 | 94 | 95 |
| Example 11 | Battery 11 | Solution 11 (Vinylene carbonate) (Propane sultone) | m-Terphenyl of partial hydrogenation ratio of 42% (m-Terphenyl 3.7 wt %) | 47 | 81 | 94 | 96 |

TABLE 3-continued

| | Battery | Electrolyte solution | Additive* | Current cut-off time (min) | Max. temp (° C.) | Low-temp characteristics (%) | Recovery after storage (%) |
|---|---|---|---|---|---|---|---|
| Example 12 | Battery 12 | Solution 12 | m-Terphenyl of partial hydrogenation ratio of 41% (m-Terphenyl 8.3 wt %) | 46 | 80 | 95 | 89 |

*Partially hydrogenated m-terphenyl was added at a concentration of 2 wt % based on the total weight of the electrolyte solution.
**Not more than the detection limit of gas chromatography The overcharge characteristics, low-temperature characteristics, and storing characteristics are improved by adjusting the m-terphenyl content in the partially hydrogenated m-terphenyl to be not higher than 6 wt %.

Example 13

EC and EMC were mixed at a volume ratio of 3:7 in a dry argon atmosphere. Therein, sufficiently dried $LiPF_6$ was dissolved at a ratio of 1 mol/l. Thereto a partially hydrogenated m-terphenyl of partial hydrogenation ratio of 44% and of 1,3-diphenylcyclohexane content of 58.4 wt % was added at a concentration of 2 wt % based on the total weight of the electrolyte solution to prepare an electrolyte solution. The solubility of the partially hydrogenated m-terphenyl in the electrolyte solution was not lower than 3 wt % at room temperature. This electrolyte solution is named Electrolyte Solution 13.

The content of m-terphenyl was obtained from values of gas chromatography. Table 4 shows the constituting components of the partially hydrogenated m-terphenyl in the electrolyte solution used in Examples 13–16.

TABLE 4

| Composition [wt %] | Example 13 (Electr. Solution 13) | Example 14 (Electr. Solution 14) | Example 15 (Electr. Solution 15) | Example 16 (Electr. Solution 16) |
|---|---|---|---|---|
| Fully hydrogenated m-terphenyl | 0.0 | 0.0 | 0.1 | 0.0 |
| 1,3-Dicyclohexylbenzene | 2.5 | 6.7 | 34.6 | 2.5 |
| 3-Phenylbicyclohexyl | 31.6 | 59.7 | 34.7 | 31.6 |
| 1,3-Diphenylcyclohexane | 58.4 | 31.4 | 17.3 | 58.4 |
| m-Cyclohexylbiphenyl | 6.5 | 1.4 | 13.0 | 6.5 |
| m-Terphenyl | 0.0 | 0.0 | 0.0 | 0.0 |
| Others | 1.0 | 0.8 | 0.3 | 1.0 |
| Total | 100.0 | 100.0 | 100.0 | 100.0 |
| Partial hydrogenation ratio [%] | 44 | 55 | 56 | 44 |

Note:
In the composition of the table, the numeral 0.0 means the content of not more than the detection limit (0.1 wt %) by gas chromatography. Since the composition values are shown by one decimal place in the table, the arithmetical total of the composition values may not be 100.

Example 14

In a similar manner as in Example 13, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 55% and of 1,3-diphenylcyclohexane content of 31.4 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 14. Battery 14 was produced in the same manner as in Example 1 except that Electrolyte Solution 14 was used in place of Electrolyte Solution 1.

Example 15

In a similar manner as in Example 13, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 56% and of 1,3-diphenylcyclohexane content of 17.3 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 15. Battery 15 was produced in the same manner as in Example 1 except that Electrolyte Solution 15 was used in place of Electrolyte Solution 1.

Example 16

In a similar manner as in Example 13, an electrolyte solution was prepared by mixing EC and EMC in a volume ratio of 3:7, dissolving $LiPF_6$ therein at a ratio of 1 mol/l, and adding thereto VC at a concentration of 2 wt %, and partially hydrogenated m-terphenyl of partial hydrogenation ratio of 44% and of 1,3-diphenylcyclohexane content of 58.4 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 16. Battery 16 was produced in the same manner as in Example 1 except that Electrolyte Solution 16 was used in place of Electrolyte Solution 1.

Batteries 13–16 and Comparative Battery 1 produced in the above Examples 13–16 and Comparative Example 1 were tested for the safety of the battery in the overcharged state, and the low-temperature characteristics and the recovery ratio after storage of the battery in the same manner as mentioned before. Here the storage conditions in the test for the recovery ratio after storage was changed from an atmosphere at 60° C. for 20 days to an atmosphere at 85° C. for 3 days, and the recovery ratio after storage was calculated from the discharging capacities before and after storage at 85° C. Table 5 shows the results.

TABLE 5

| | Battery | Electrolyte solution | Cyclohexyl-biphenyl in electrolyte solution [wt %] | Current cut-off time (min) | Maximum temp (° C.) | Low-temp characteristics (%) | Recovery ratio after storage (%) |
|---|---|---|---|---|---|---|---|
| Example 13 | Battery 13 | Solution 13 | 1.17 | 48 | 81 | 95 | 91 |
| Example 14 | Battery 14 | Solution 14 | 0.63 | 48 | 80 | 95 | 90 |
| Example 15 | Battery 15 | Solution 15 | 0.35 | 48 | 80 | 95 | 90 |
| Example 16 | Battery 16 | Solution 16 (Vinylene carbonate) | 1.17 | 47 | 80 | 95 | 92 |
| Comparative Example 1 | Comparative Battery 1 | Comparative Solution 1 | None | 51 | Ruptured | 97 | 93 |

Table 5 shows that Comparative Battery 1 containing no additive for overcharge suppression ruptured in 51 minutes in overcharging test although the battery was excellent in the low-temperature characteristics and the storing characteristics.

In contrast, Batteries 13–16 of the present invention using partially hydrogenated m-terphenyl containing 1,3-diphenylcyclohexane at a content of 10–65 wt % were excellent in all of the overcharging characteristics, the low-temperature characteristics, and the storing characteristics.

Example 17

EC and EMC were mixed at a volume ratio of 3:7 in a dry argon atmosphere. Therein, sufficiently dried $LiPF_6$ was dissolved at a ratio of 1 mol/l. Thereto a partially hydrogenated m-terphenyl of partial hydrogenation ratio of 50% and of m-cyclohexylbiphenyl content of 26.9 wt % was added at a concentration of 2 wt % based on the total weight of the electrolyte solution to prepare an electrolyte solution. The solubility of the partially hydrogenated m-terphenyl in the electrolyte solution was not lower than 3 wt % at room temperature. This electrolyte solution is named Electrolyte Solution 17.

The content of m-terphenyl was obtained from values of gas chromatography. Table 6 shows the constituting components of the partially hydrogenated m-terphenyl in the electrolyte solution used in Examples below.

TABLE 6

| Composition [wt %] | Example 17 (Electr. Solution 17) | Example 18 (Electr. Solution 18) | Example 19 (Electr. Solution 19) | Example 20 (Electr. Solution 20) |
|---|---|---|---|---|
| Fully hydrogenated m-terphenyl | 0.1 | 0.1 | 0.0 | 0.1 |
| 1,3-Dicyclohexylbenzene | 24.0 | 34.6 | 2.5 | 24.0 |
| 3-Phenylbicyclohexyl | 25.3 | 34.7 | 31.6 | 25.3 |
| 1,3-Diphenylcyclohexane | 23.1 | 17.3 | 58.4 | 23.1 |
| m-Cyclohexylbiphenyl | 26.9 | 13.0 | 6.5 | 26.9 |

TABLE 6-continued

| Composition [wt %] | Example 17 (Electr. Solution 17) | Example 18 (Electr. Solution 18) | Example 19 (Electr. Solution 19) | Example 20 (Electr. Solution 20) |
|---|---|---|---|---|
| m-Terphenyl | 0.0 | 0.0 | 0.0 | 0.0 |
| Others | 1.6 | 0.3 | 1.0 | 0.6 |
| Total | 100.0 | 100.0 | 100.0 | 100.0 |
| Partial hydrogenation ratio (%) | 50 | 56 | 44 | 50 |

Note:
In the composition of the table, the numeral 0.0 means the content of not more than the detection limit by gas chromatography. Since the composition values are shown by one decimal place in the table, the arithmetical total of the composition values may not be 100.

Example 18

In a similar manner as in Example 17, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 56% and of m-cyclohexylbiphenyl content of 13.0 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 18. Battery 18 was produced in the same manner as in Example 1 except that Electrolyte Solution 18 was used in place of Electrolyte Solution 1.

Example 19

In a similar manner as in Example 17, an electrolyte solution was prepared by mixing EC and EMC in a volume ratio of 3:7, dissolving $LiPF_6$ therein at a ratio of 1 mol/l, and adding thereto partially hydrogenated m-terphenyl of partial hydrogenation ratio of 44% and of m-cyclohexylbiphenyl content of 6.5 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 19. Battery 19 was produced in the same manner as in Example 1 except that Electrolyte Solution 19 was used in place of Electrolyte Solution 1.

Example 20

In a similar manner as in Example 17, an electrolyte solution was prepared by mixing EC and EMC in a volume ratio of 3:7, dissolving $LiPF_6$ therein at a ratio of 1 mol/l, and adding thereto VC at a concentration of 2 wt %, and partially hydrogenated m-terphenyl of partial hydrogenation ratio of 50% and of m-cyclohexylbiphenyl content of 26.9 wt % at a concentration of 2 wt % based on the total weight of the electrolyte solution. The partially hydrogenated m-terphenyl had a solubility of not less than 3 wt % in the electrolyte solution at room temperature. This electrolyte solution was named Electrolyte Solution 20. Battery 20 was produced in the same manner as in Example 1 except that Electrolyte Solution 20 was used in place of Electrolyte Solution 1.

Batteries 16–19 produced in the above Examples 16–19 were tested for the safety in the overcharged state, the low-temperature characteristics, and the recovery ratio after storage of the batteries in the same manner as mentioned before. Here the conditions of the test for the recovery ratio after storage were changed from an atmosphere at 60° C. for 20 days to an atmosphere at 85° C. for 3 days, and the recovery ratio after storage was calculated from the discharging capacities before and after storage at 85° C. Table 7 shows the results.

INDUSTRIAL APPLICABILITY

A partially hydrogenated terphenyl having a solubility not lower than a specified level in the electrolyte solution is selected as the additive in the non-aqueous electrolyte solution secondary battery, which secures the safety of the battery in an overcharged state, and contributes to miniaturization, improvement of the battery performance, and the battery safety of the non-aqueous electrolyte solution secondary battery, without affecting adversely to battery characteristics such as low-temperature characteristics and storing characteristics.

The invention claimed is:

1. A non-aqueous electrolyte solution containing an organic solvent, and a lithium salt as an electrolyte, that is useful for the preparation of a secondary battery that is equipped with a negative electrode and a positive electrode, each of which is capable of storing and releasing lithium, wherein the non-aqueous electrolyte solution contains partially hydrogenated terphenyl and is a mixture of two or more compounds of which one is diphenylcyclohexane that is present in an amount ranging from 10 to 65 wt % of the partially hydrogenated terphenyl.

2. The non-aqueous electrolyte solution according to claim 1, wherein the content of terphenyl in the partially hydrogenated terphenyl is not more than 6 wt %.

3. The non-aqueous electrolyte solution according to claim 1, wherein one of the compounds of said mixture of

TABLE 7

| | Battery | Electrolyte Solution | Cyclohexyl-biphenyl in electrolyte solution [wt %] | Current cut-off time (min) | Maximum Temperature (° C.) | Low-temp characteristics (%) | Recovery ratio after storage (%) |
|---|---|---|---|---|---|---|---|
| Example 17 | Battery 17 | Solution 17 | 0.54 | 48 | 80 | 96 | 90 |
| Example 18 | Battery 18 | Solution 18 | 0.26 | 48 | 80 | 95 | 90 |
| Example 19 | Battery 19 | Solution 19 | 0.13 | 48 | 81 | 95 | 91 |
| Example 20 | Battery 20 | Solution 20 (Vinylene carbonate) | 0.54 | 47 | 80 | 95 | 92 |

Table 7 as described above shows that Batteries 17–20 of the present invention using partially hydrogenated m-terphenyl containing m-cyclohexyl biphenyl at a content of 3–35 wt % or less were excellent in all of the overcharging characteristics, the low-temperature characteristics, and the storing characteristics.

While the invention has been described in detail and with reference to specific embodiments thereof, it will be apparent to one skilled in the art that various changes and modifications can be made therein without departing from the spirit and scope thereof.

This application is based on Japanese patent applications No. 2001-227476 filed on Jul. 27, 2001, No. 2001-289868 filed on Sep. 21, 2001, No. 2001-289869 filed on Sep. 21, 2001 and No. 2001-289870 filed on Sep. 21, 2001, the entire contents thereof being hereby incorporated by reference.

two or more compounds is cyclohexylbiphenyl which is present in the partially hydrogenated terphenyl in an amount ranging from 3 to 35 wt %.

4. The non-aqueous electrolyte solution according to claim 1, wherein the terphenyl is m-terphenyl.

5. A non-aqueous electrolyte solution containing an organic solvent, and a lithium salt as an electrolyte, that is useful for the preparation of a secondary battery that is equipped with a negative electrode and a positive electrode, each of which is capable of storing and releasing lithium, wherein the non-aqueous electrolyte solution contains partially hydrogenated m-terphenyl.

6. The non-aqueous electrolyte solution according to claim 5, wherein the content of m-terphenyl in the partially hydrogenated m-terphenyl is not more than 6 wt %.

7. The non-aqueous electrolyte solution according to claim 1, wherein the partial hydrogenation ratio of the partially hydrogenated terphenyl ranges from 30 to 70%.

8. The non-aqueous electrolyte solution according to claim 1, wherein the content of the partially hydrogenated terphenyl ranges from 0.01 to 10 wt % based on the total weight of the non-aqueous electrolyte solution.

9. A non-aqueous electrolytesolution containing an organic solvent, and a lithium salt as an electrolyte, that is useful for the preparation of a secondary battery that is equipped with a negative electrode and a positive electrode, each of which is capable of storing and releasing lithium, wherein the non-aqueous electrolyte solution contains diphenylcyclohexane at a content ranging from 0.01 to 6.5 wt % based on the total weight of the non-aqueous electrolyte solution.

10. The non-aqueous electrolyte solution according to claim 1, wherein the non-aqueous electrolyte solution contains a cyclic carbonic acid ester represented by formula (I) at a content ranging from 0.1 to 10 wt % based on the total weight of the non-aqueous electrolyte solution:

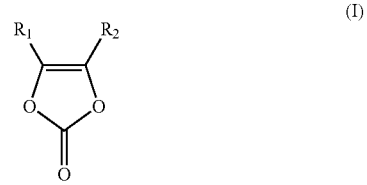

wherein $R_1$ and $R_2$ represent independently a hydrogen atom or methyl.

* * * * *